Feb. 16, 1932.    D. A. WEBER    1,845,374
SAND BLENDING APPARATUS
Filed May 5, 1930    3 Sheets-Sheet 1

Inventor:
DON A. WEBER,
By John H. Bruninga
His Attorney.

Feb. 16, 1932.  D. A. WEBER  1,845,374
SAND BLENDING APPARATUS
Filed May 5, 1930   3 Sheets-Sheet 3

Inventor:
Don A. Weber,
By John N. Bruninga
His Attorney.

Patented Feb. 16, 1932

1,845,374

UNITED STATES PATENT OFFICE

DON A. WEBER, OF FORT WAYNE, INDIANA, ASSIGNOR TO THE DEISTER CONCENTRATOR COMPANY, OF FORT WAYNE, INDIANA, A CORPORATION OF INDIANA

SAND BLENDING APPARATUS

Application filed May 5, 1930. Serial No. 449,745.

This invention pertains to blending or mixing apparatus such as may be used for blending two or more kinds of granular materials such, for instance, as foundry sand; and at the same time effect an even distribution of moisture thruout the material by blending in whatever water is added. The invention also pertains to an improved method for carrying out such a blending operation.

In handling certain kinds of granular materials such, for instance, as foundry sand, it is important to prepare the material for use in such a form that it will be homogeneous and uniform as to its texture throughout the mass of material. In foundry operations, sand which has already been used for molding and which has become comparatively dry and hard is mixed with new or green sand and water so as to provide a mixture or blend of the two, obtaining simultaneously the proper distribution of moisture to make the material ready for moulding operations. It is important to have this blend uniform throughout, furthermore, as the used sand is often hard and in the form of lumps, it is important to reduce these to a fine granular condition suitable for molding. Accordingly, the invention lends itself particularly to the blending of molding sand.

One of the objects, therefore, is to provide an improved method or procedure for carrying out such a blending operation.

Another object is to provide a method in which the material is not only properly mixed or blended but in which it is aerated so as to free it of entrapped gases and permit the absorption of air or oxygen by the granulated material.

Another object is to provide a method which will free the material of lumps and oversize particles as well as foreign matter such as scraps of metal and the like.

Another object is to provide an improved apparatus for reducing the material to granular form and mixing or blending the various ingredients.

Another object is to provide an apparatus by which the material is first freed of oversize particles and foreign matter and then the granular material is blended.

Another object is to provide such apparatus in portable form so that it may be easily moved to the location at which it is to be used.

Another object is to provide an apparatus in convenient form such that the material may pass by gravity from one operation to the next.

Another object is to provide such apparatus which will be simple and economical to manufacture and of rugged construction and which shall be free from vibration during its operation.

Further objects will appear from the following description taken in connection with the accompanying drawings; in which.

Figure 1:
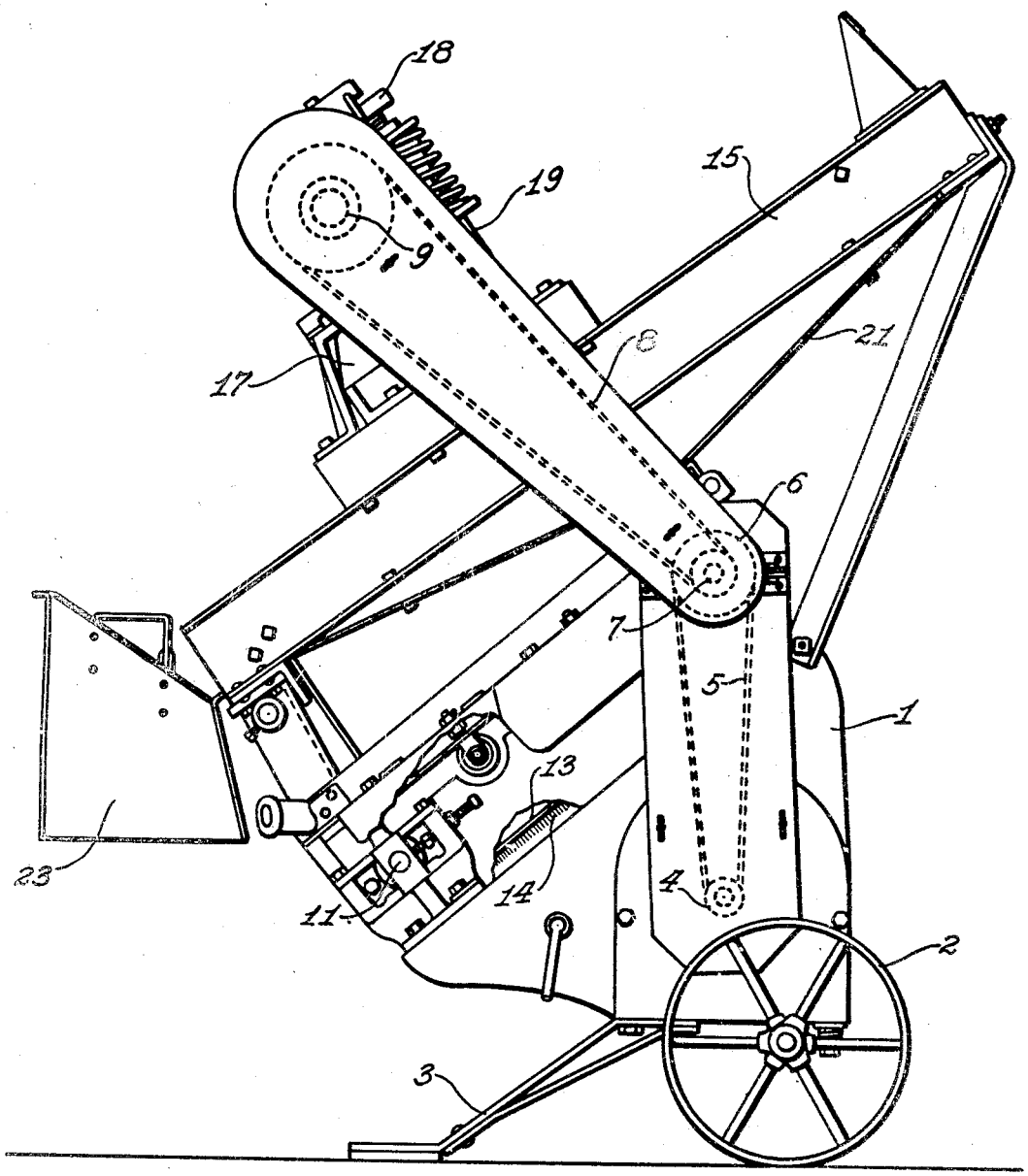
Figure 1 is a side elevation of a machine embodying this invention and adapted for carrying out the process thereof.
Figure 2:
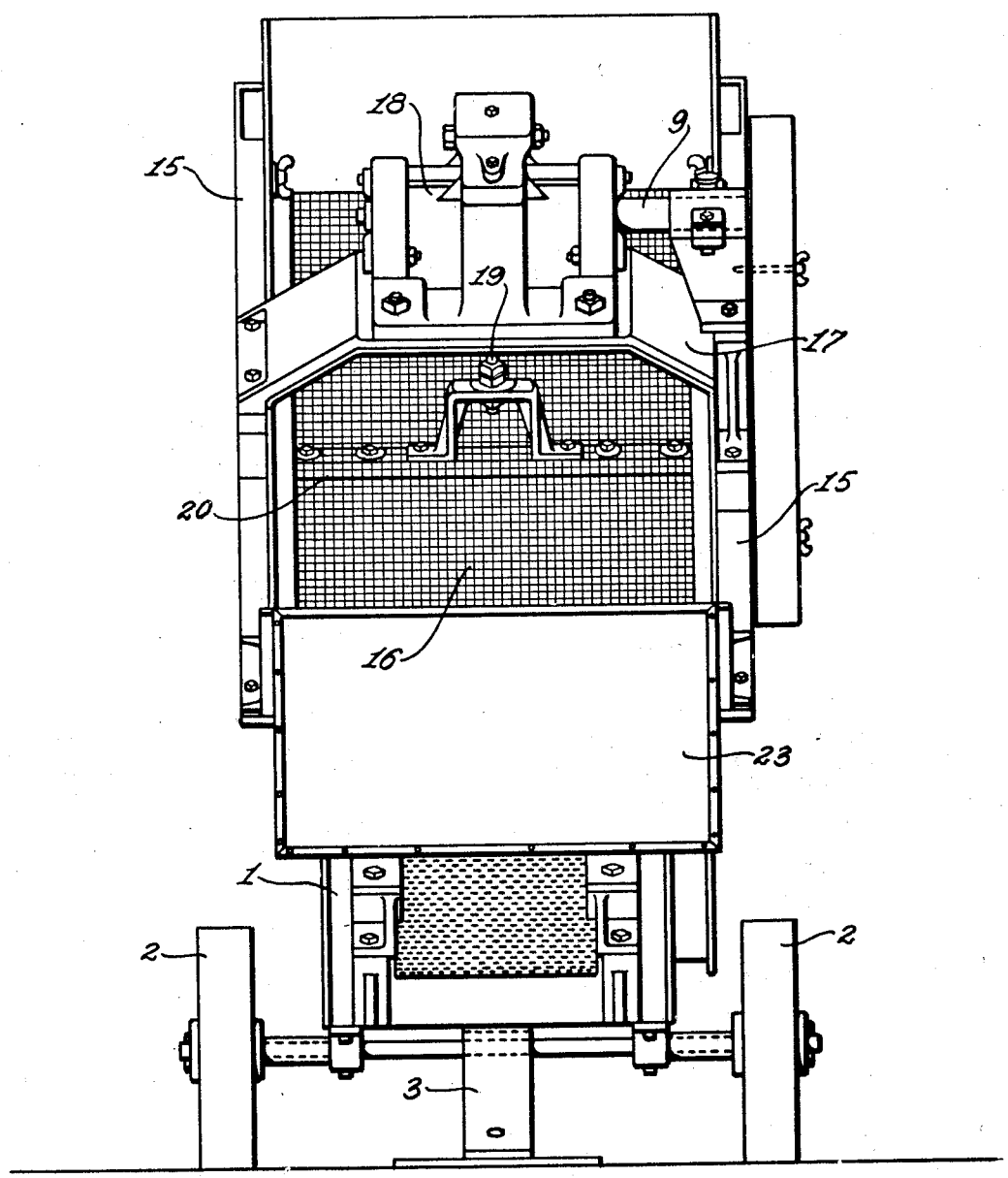
Figure 2 is a left hand end view of Fig. 1.
Figure 3:
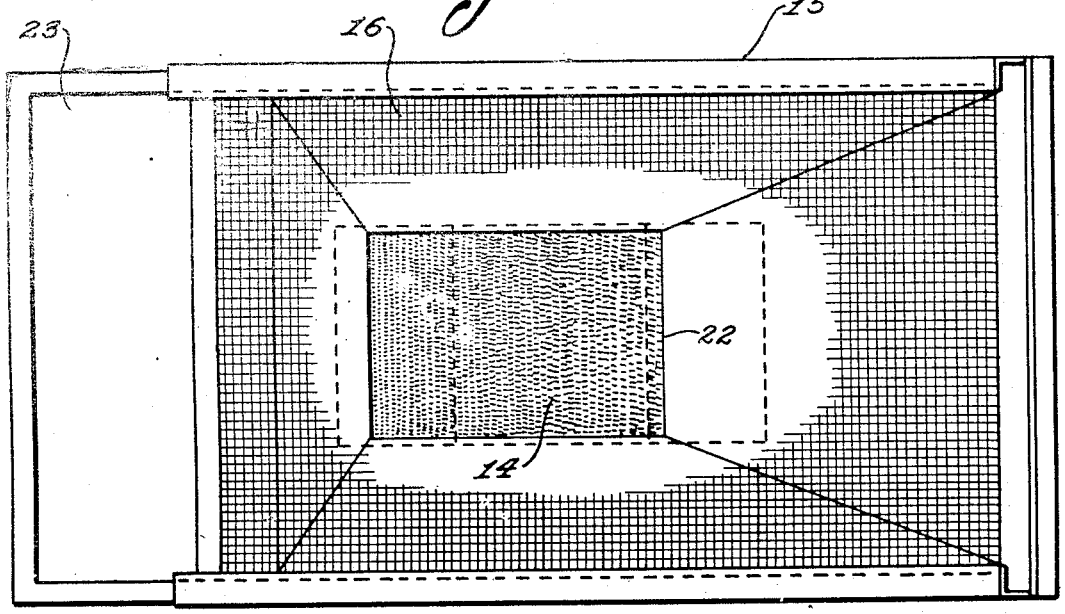
Figure 3 is a plan view of the screen with the blending device therebeneath.

Referring now to the drawings, 1 designates a body or frame upon which the apparatus is mounted. This may be provided with wheels 2 so as to be easily portable and a foot or rest 3 upon which it may stand when stationary. The body 1 may have mounted thereon a motor of any suitable type having a pulley or sprocket 4 connected by a belt or chain 5 with a similar pulley or sprocket 6 on a shaft 7 which drives the blending mechanism. Any other suitable form of driving connections, may of course, be used. Similarly the shaft 7 may be connected as by a belt 8 to drive a shaft 9 which operates the screen vibrating mechanism. The device may also be mounted permanently on a stationary foundation when portability is not required.

The shaft 7 carries a drum 10. Spaced from the shaft 7 is another shaft 11 carrying a drum 12. The drums 10 and 12 carry a blending or mixing belt 13. The outer surface of the belt 13 is provided with outwardly projecting sprigs or pins 14 which are spaced to provide a large number of cells or pockets adapted to collect small granular particles separated from the mass of material which rests upon the belt. The belt is mounted at a steep incline and is driven by the shaft 7 at a rapid rate in the direction indicated by the arrow in Figure 4. The inclination of the belt causes the mass or body of material deposited thereon to tend to move downwardly or in the opposite direction to the travel of the upper run of the belt and this assists the sprigs or pins 14 in separating particles of the granular material from the mass and collecting the same in the small cells or pockets. This belt may be similar to that described in United States Patent No. 1,559,915, issued November 3, 1925, to George E. Royer, to which references may be had for detailed description thereof.

As the details of the above described blending mechanism are not part of this invention, any other form of blending or mixing mechanism may be used with this invention.

Mounted on the body 1 and above the belt 13 is a rigid frame 15. Stretched across this frame, also at an inclination to the vertical, is a screening medium 16 such as wire cloth or the like. This medium is provided with meshes of a size in accordance with the fineness of the granulated material desired.

Mounted on the frame 15 is a bridge 17 which carries vibrating mechanism 18 of any suitable type connected by means of a rod or link 19 with a transverse bar 20 secured to the screen cloth 16 at a medial portion thereof. The vibrating mechanism 18 being mounted by means of the bridge 17 upon the rigid frame 15 will vibrate only the screen cloth 16 and none of this vibration is transmitted to the frame 15 or the body 1.

Below the screen 16 is a hopper 21 adapted to receive and collect the screened material that passes through the screen 16 and to deposit the same on the upper run of the belt 14. The hopper is so formed as to collect all of this material and has an opening 22 over the belt 14.

Fixed to the lower end of the frame 15 is a box or receiver 23 adapted to catch the oversize material passing down off the screen 16.

In the operation of this machine the motor is set into operation so as to vibrate the screen 16 and drive the belt 13 at a rapid rate. The raw material is deposited by any suitable means upon the vibrating screen 16. The material so deposited may contain two or more different ingredients.

The action of the screen 16 is such as to separate the fine granular material from the lumps or oversize material or foreign matter which cannot be broken up. It also acts to break up some of the lumps thereby reducing them to a granular form so as to pass through the meshes of the screen. If two or more ingredients are placed upon the screen 16, its action also affects a partial blending of that part of the material which passes through the screen in granular form.

The hopper 21 collects the granular material passing through the screen and deposits the same upon the belt 13. The speed of the belt is so adjusted as to tend to counteract at least in part, the tendency of the mass of material deposited thereon to move downwardly therealong. As the belt passes rapidly under the mass of material the granular particles are scraped off from the mass by the springs or pins 14 and held in the cells or pockets between them. In other words, these pins exert a comb-like action on the lower surface of the material to separate the small particles therefrom. As the speed of the belt is adjusted so that each pocket travels substantially the full length of the hopper before it is completely filled, it will be seen that each cell collects granules from different points along the whole length of the mass of material resting on the belt. These particles are collected from widely spaced points of the mass into one unit contained in a pocket of the belt. As this action takes place at each cell or unit, it will be seen that a thorough mixing or blending of the material is accomplished.

A stationary brush 24 is mounted upon the hopper just above the upper drum 10 so as to restrain the mass of material from any tendency to move upwardly with the belt.

Figure 4:
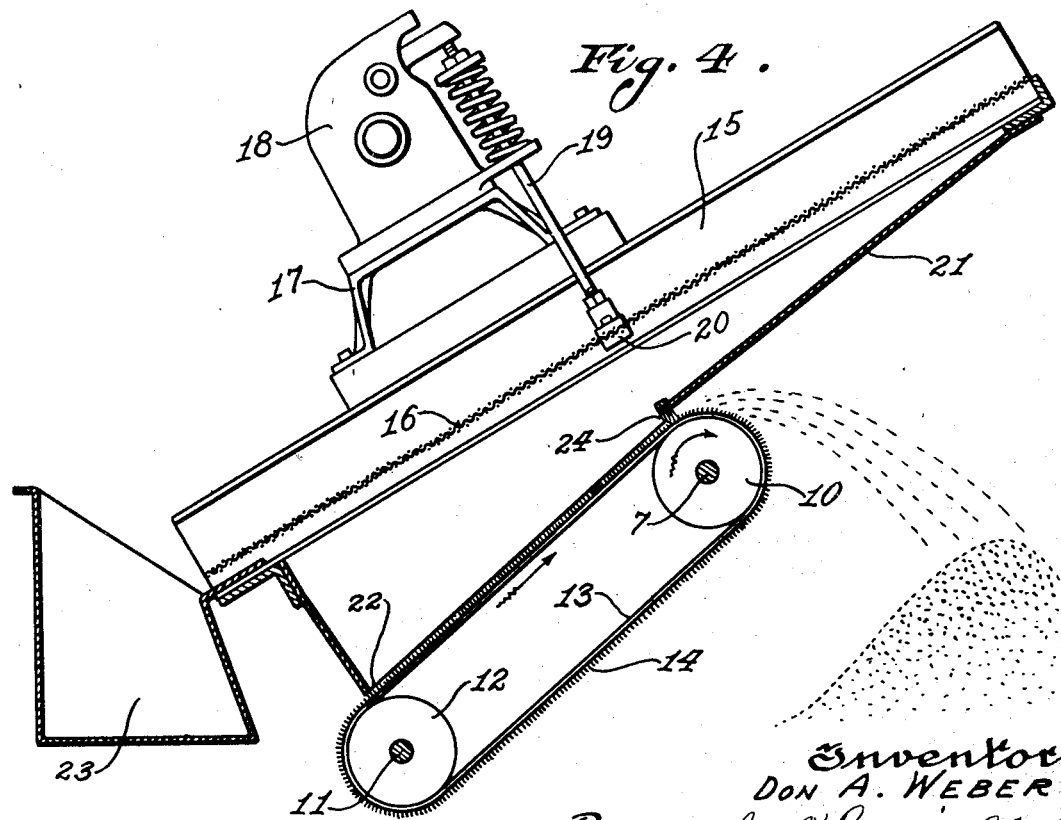
Figure 4 is a sectional detail showing the relative positions of the screening and blending mechanisms.

After passing the brush 24, the belt passes at a high speed over the roll 10. This movement causes the particles contained in the pockets of the belt to be centrifugally discharged therefrom. The particles are thrown from the belt through the air as indicated in Figure 4, to be deposited on a pile beyond the machine. As the particles are thus thrown from the belt, a further mixing or blending takes place since the particles are discharged promiscuously so as to fall in a mixed heap upon the floor.

It will be noted that as the granular particles pass through the screen 16 they are caused to fall through the air in passing from said screen to the belt 13. Again when discharged from the belt 13 the particles are again caused to fall through the air. These passages through the air provide for aerating the material so as to permit any entrapped gases to escape and allow the absorption of air. Thus the finished product is not only completely granulated but is thoroughly mixed or blended and aerated.

As the result of the operation of this machine and in accordance with the method of this invention, the capacity of the belt 13 for handling material is greatly increased. It will be noted that it handles only material already granulated and there is no oversize or foreign material deposited on the belt. Such oversize and foreign materials are eliminated by the screen 16 which also insures a thorough granulation of the material before depositing upon the belt.

Another result of the operation of this invention is a cleaner and better product since it has passed through two blending operations as well as two aerating operations. The efficiency of the blending operation performed by the belt 14 is increased on account of the fact it handles only granular material and is not required to perform a granulating operation.

As a result of this invention furthermore, the oversize and foreign materials are continually discharged by the screen 16 since its inclined position causes said materials to move downwardly thereover into the receiver 23. Accordingly, it is unnecessary to stop the machine to remove such oversize materials and the operation may be carried on continuously without interruption. Accordingly, the output of the machine as a whole is thereby further increased.

While this machine has been described as a complete unit, it will be understood that certain individual features or sub-combinations thereof are useful without reference to the other features or sub-combinations and that the employment of such individual features or sub-combinations is contemplated by this invention and is within the scope of the appended claims.

It is further obvious that various changes may be made in details, within the scope of the appended claims, without departing from the spirit of this invention. It is, therefore, to be understood that this invention is not to be limited to the specific details shown and/or described.

Having thus described the invention, what is claimed is:

1. Blending apparatus for granular materials, comprising, a traveling carriage, an inclined upwardly moving belt mounted on said carriage and provided on its outer face with means for collecting particles of material from the mass of material deposited upon it and causing the collected material to move upwardly with said belt, a brush adapted to restrain upward movement of the mass of material, said belt being constructed and arranged to deposit its collected material beyond said brush, a screening device mounted on said carriage above said belt and adapted to deposit the screened material thereon, and means adapted to eject the unscreened refuse material.

2. Blending apparatus for granular materials, comprising, a traveling carriage, an inclined upwardly moving belt mounted on said carriage and provided on its outer face with means for collecting particles of material from the mass of material deposited upon it and causing the collected material to move upwardly with said belt, a brush adapted to restrain upward movement of the mass of material, said belt being constructed and arranged to deposit its collected material beyond said brush, a screening device mounted on said carriage above said belt, means adapted to eject the unscreened refuse material from said device, a hopper adapted to collect the screened material and deliver the same to said belt.

3. Blending apparatus for granular materials, comprising, a screening medium mounted to cause the granular material to pass therethru and to eject the refuse material, means mounted above said screening medium adapted to cause transverse vibration thereof, a hopper mounted below said medium adapted to receive and collect the screened material and having a reduced outlet opening, and blending means having a belt moving across said opening adapted to receive the screened material from said hopper.

4. Blending apparatus for granular materials, comprising, an inclined frame, a screening medium mounted in said frame, vibrating mechanism mounted on and above said frame and connected to said medium adapted to cause transverse vibration thereof, a hopper below said medium adapted to receive the screened material therefrom and having a reduced outlet opening, and blending means having a belt movable across said opening to receive the screened material from said hopper.

5. Blending apparatus for granular materials, comprising, an inclined frame, a screening medium mounted in said frame, vibrating mechanism mounted on and above said frame and connected to said medium adapted to cause transverse vibration thereof, a hopper below said medium having a receiving opening substantially co-extensive therewith adapted to receive the screened material therefrom, and having a reduced outlet opening, and blending means having a belt movable across said opening to receive the screened material from said hopper.

6. Blending apparatus for granular materials, comprising, an inclined frame, a screening medium mounted in said frame, vibrating mechanism mounted on and above said frame and connected to said medium adapted to cause transverse vibration thereof, a hopper below said medium having a receiving opening substantially co-extensive therewith adapted to receive the screened material therefrom and having a reduced inclined outlet opening, and blending means having a belt movable across said opening closely adjacent thereto to receive the screened material from said hopper.

7. Blending apparatus for granular materials, comprising, a frame, an inclined upwardly moving belt on said frame provided on its outer face with means for collecting particles of material from the mass of material deposited upon it and causing the collected material to move upwardly with said belt, a brush adapted to restrain upward movement of the mass of material, said belt being constructed and arranged to deposit its collected material beyond said brush, a screening device mounted on said frame above said belt and adapted to deposit the screened material thereon, and means adapted to eject the unscreened refuse material.

In testimony whereof I affix my signature this 21st day of February, 1930.

DON A. WEBER.